United States Patent
Park et al.

(10) Patent No.: US 7,710,746 B2
(45) Date of Patent: May 4, 2010

(54) SWITCHING MODE POWER SUPPLY AND DRIVING METHOD THEREOF

(75) Inventors: Young-Bae Park, Anyang (KR); Gwan-Bon Koo, Bucheon (KR); Hang-Seok Choi, Gunpo (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 111 days.

(21) Appl. No.: 12/151,903

(22) Filed: May 9, 2008

(65) Prior Publication Data

US 2008/0278131 A1    Nov. 13, 2008

(30) Foreign Application Priority Data

May 9, 2007    (KR) .................. 10-2007-0044959

(51) Int. Cl.
*H02M 3/335*    (2006.01)
*H02M 1/12*    (2006.01)

(52) U.S. Cl. .................. 363/21.18; 363/21.16; 363/41

(58) Field of Classification Search .......... 363/21.16, 363/21.18, 41
See application file for complete search history.

(56) References Cited

U.S. PATENT DOCUMENTS

| | | | |
|---|---|---|---|
| 6,836,415 B1 * | 12/2004 | Yang et al. | ............... 363/21.01 |
| 6,853,563 B1 | 2/2005 | Yang et al. | |
| 6,956,750 B1 | 10/2005 | Eason et al. | |
| 6,972,969 B1 | 12/2005 | Shteynberg et al. | |
| 7,016,204 B2 | 3/2006 | Yang et al. | |
| 7,061,780 B2 | 6/2006 | Yang et al. | |
| 2003/0128018 A1 | 7/2003 | Telefus et al. | |
| 2005/0254268 A1 | 11/2005 | Reinhard et al. | |
| 2005/0276083 A1 | 12/2005 | Berghegger | |

* cited by examiner

*Primary Examiner*—Shawn Riley
(74) *Attorney, Agent, or Firm*—Sidley Austin LLP

(57) ABSTRACT

A switching mode power supply includes: a power supply unit that comprises a switch that is coupled to a primary coil at a primary side of a transformer for converting an input DC voltage, and that supplies power to a secondary coil and a tertiary coil at a secondary side of the transformer according to an operation of the switch; a switching controller that receives a feedback voltage corresponding to a first voltage generated in the secondary coil at the secondary side of the transformer, and receives a detection signal corresponding to a current flowing to the switch to control an on/off operation of the switch; and a feedback signal generator that receives the first voltage and the switching control signal, samples the first voltage by using first pulse strings, and generates the feedback voltage according to a level of the first voltage sampled by a first pulse in the first pulse strings, wherein a toggling time of the first pulse strings is changed in a first period for sampling the first voltage, and a time for sampling the first voltage is changed.

47 Claims, 15 Drawing Sheets

FIG. 9

| Bit value | Carry signal |
|---|---|
| 0 0 0 | Low |
| 0 0 1 | Low |
| 0 1 0 | Low |
| 0 1 1 | Low |
| 1 0 0 | Low |
| 1 0 1 | Low |
| 1 1 0 | Low |
| 1 1 1 | High |

SWITCHING MODE POWER SUPPLY AND DRIVING METHOD THEREOF

CROSS-REFERENCE TO RELATED APPLICATION

This application claims priority to and the benefit of Korean Patent Application No. 10-2007-0044959 filed in the Korean Intellectual Property Office on May 9, 2007, the entire contents of which are incorporated herein by reference.

BACKGROUND

1. Field of the Invention

The present invention relates to a switching mode power supply and a driving method thereof.

2. Description of the Related Art

A switching mode power supply (hereinafter referred to as an "SMPS") is a device that rectifies an input AC voltage to an input DC voltage (DC-link voltage) and then converts the input DC voltage to an output DC voltage having another level. The output DC voltage can be higher or lower than the input DC voltage. An SMPS is often used in battery powered devices such as power electric devices, mobile phones, and laptop computers.

In general, an SMPS can include a transformer, and has a switching transistor at a primary side of a transformer that receives a DC voltage and controls the duty of the switching transistor. An SMPS can use a feedback loop to transfer a voltage or a current of an output unit to the primary side of the transformer, e.g., through an opto-coupler or through a shunt regulator that is coupled to the output side of the transformer. Application of such a feedback loop allows delivery of a regulated output DC voltage through the output unit.

However, since opto-couplers and shunt regulators are expensive and large, it is difficult to highly integrate an SMPS into circuits and contain cost.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments of the present invention provide a switching mode power supply that detects an output DC voltage of an output unit, and a driving method thereof.

In an embodiment of the present invention, a switching mode power supply includes a power supply unit, a switching controller, and a feedback signal generator. The power supply unit includes a switch that is coupled to a primary coil at a primary side of a transformer for converting an input DC voltage, and supplies power to a secondary coil and a tertiary coil at a secondary side of the transformer according to an operation of the switch. The switching controller receives a feedback voltage corresponding to a first voltage generating in the secondary coil at the secondary side of the transformer, and receives a detection signal corresponding to a current flowing to the switch to control an on/off operation of the switch. The feedback signal generator receives the first voltage and the switching control signal, samples the first voltage by using first pulse strings, and generates the feedback voltage according to a level of the first voltage sampled by a first pulse in the first pulse strings. A toggling time of the first pulse strings is changed in a first period for sampling the first voltage, and a time for sampling the first voltage is changed.

In another embodiment of the present invention, a switching mode power supply for generating an output DC voltage by converting a DC voltage includes a controller, an output unit, and a voltage distribution unit. The controller includes a switch having a first terminal coupled to an input terminal of the DC voltage, and controls an operation of the switch according to a voltage level of a first voltage corresponding to the output DC voltage. The output unit includes an inductor with one terminal coupled to a second terminal of the switch, a capacitor with one terminal coupled to another terminal of the inductor, and a diode with an anode coupled to another terminal of the capacitor and with a cathode coupled to one terminal of the inductor, and generates the output DC voltage according to turning on/off of the switch. The voltage distribution unit distributes a voltage that is applied to both terminals of the inductor to generate the first voltage, the controller includes a switching controller and a feedback signal generator, and the switching controller receives a feedback voltage corresponding to the first voltage to control an on/off operation of the switch. The feedback signal generator receives the first voltage and the switching control signal, samples the first voltage by using first pulse strings, and generates the feedback voltage according to a level of the first voltage sampled by a first pulse in the first pulse strings. The toggling time of the first pulse strings is changed in a first period for sampling the first voltage, and a time for sampling the first voltage is changed.

In a third embodiment of the present invention, in a driving method of a switching mode power supply for converting an input voltage according to an operation of a switch to generate an output voltage, a first voltage corresponding to the output voltage is generated, the first voltage is sampled by using a first pulse in first pulse strings during a first period, and an on/off operation of the switch is controlled according to a level of the sampled first voltage. Here, a time for toggling first pulse strings is varied during the first period, and a time for sampling the level of the first voltage is varied.

BRIEF DESCRIPTION OF THE DRAWINGS

FIG. 9 is a diagram representing an N bit counter as a 3 bit counter.

DETAILED DESCRIPTION

Figure 1:
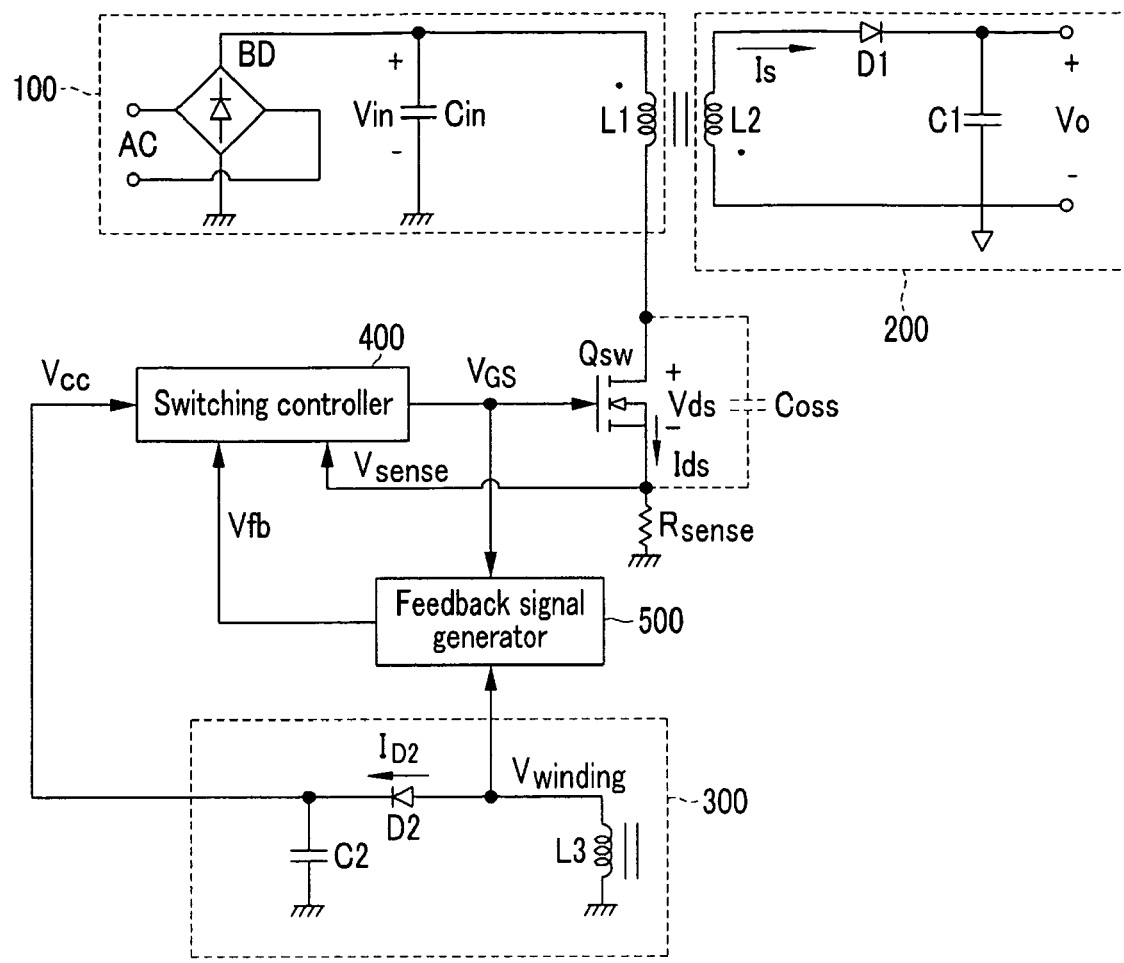
FIG. 1 illustrates an SMPS.

In the following detailed description, only certain embodiments are described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

FIG. 1 illustrates an SMPS. The SMPS can include a power supply unit 100, an output unit 200, a bias voltage supply unit 300, a switching controller 400, and a feedback signal generator 500.

The power supply unit 100 can include a bridge diode BD for rectifying an AC input, a capacitor Cin for smoothing the rectified voltage, and a primary coil L1 of a transformer with one terminal coupled to the capacitor Cin and another terminal to a switching transistor Qsw and a sense resistor. The power supply unit 100 can convert the AC input voltage to a DC voltage Vin by the bridge diode BD and the capacitor Cin, and supply power to a secondary side, such as the output unit 200 of the transformer, according to the duty of the switching transistor Qsw.

The output unit 200 can include a secondary coil L2 of the transformer, a diode D1 with an anode coupled to one terminal of the secondary coil L2 of the transformer, and a capacitor C1 coupled between a cathode of the diode D1 and a ground. The voltage between two terminals of the capacitor C1 can be an output voltage Vo.

The bias voltage supply unit 300 can include a coil L3 on the secondary side of the transformer, a diode D2 with an anode coupled to one terminal of the coil L3, and a capacitor C2 coupled between a cathode of the diode D2 and a ground. The bias voltage supply unit 300 can supply a bias voltage Vcc for operating the switching controller 400 by the diode D2 and capacitor C2 rectifying and smoothing the voltage induced in the coil L3 by the repeated switching action of the switching transistor Qsw.

The switching controller 400 can receive a feedback signal Vfb from the feedback signal generator 500, and a signal Vsense that corresponds to a current Ids flowing through the switching transistor Qsw. The switching controller 400 can compare the feedback signal Vfb with the Vsense signal and generate a pulse width modulation signal according to a result of the comparison to output a $V_{GS}$ gate control signal for controlling the switching transistor Qsw.

The feedback signal generator 500 can receive a Vwinding voltage of the coil L3 and the $V_{GS}$ signal to generate the feedback signal Vfb. The feedback signal Vfb is a signal having information corresponding to the output voltage Vo and is used to determine a turn-off time of the switching transistor Qsw. The feedback signal generator 500 can send the feedback signal Vfb to the switching controller 400.

The switching controller 400, the feedback signal generator 500, and the switching transistor Qsw may be formed on one chip or on separate chips.

Figure 2:
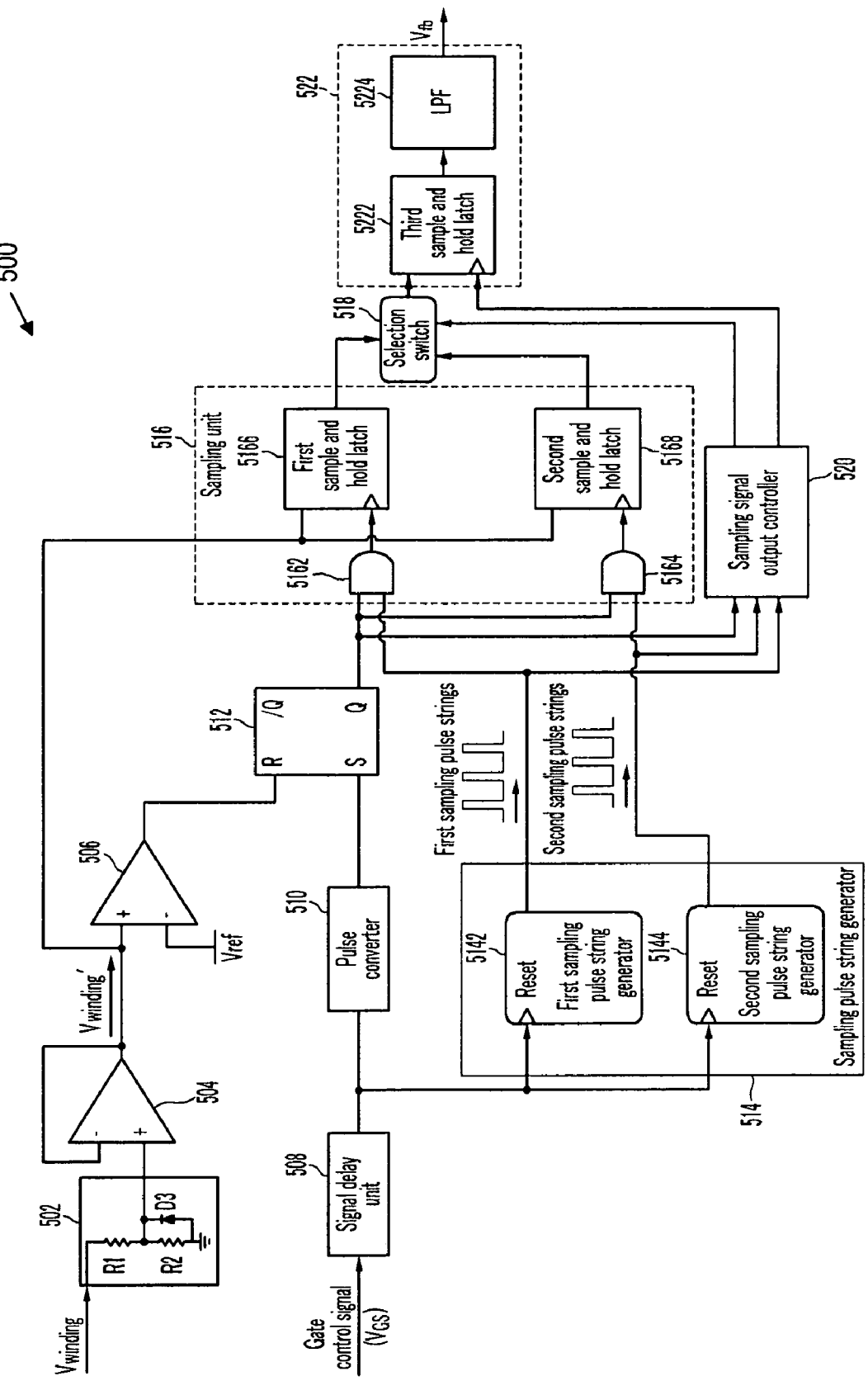
FIG. 2 illustrates an embodiment of a feedback signal generator.

FIG. 2 illustrates an embodiment of the feedback signal generator 500. The feedback signal generator 500 can include a voltage distribution unit 502, a buffer 504, a comparator 506, a signal delay unit 508, a pulse converter 510, an SR latch 512, a sampling pulse string generator 514, a sampling unit 516, a selection switch 518, a sampling signal output controller 520, and a sampling signal output unit 522.

The voltage distribution unit 502 can include a resistor R1 with one terminal coupled to an input voltage, a resistor R2 with one terminal coupled to a node shared with the other terminal of the resistor R1 and the other terminal coupled to a ground, and a diode D3 with an anode coupled to the ground and a cathode coupled to the node shared by the resistors R1 and R2. The input voltage can be the Vwinding voltage. The voltage distribution unit 502 can scale down the Vwinding voltage according to the resistor ratio R1 over R2, and output the scaled down voltage to a non-inverting input terminal of the buffer 504. If the Vwinding voltage becomes less than a predetermined level, the diode D3 prevents a negative voltage from being applied to the non-inverting input terminal of the buffer 504.

The buffer 504 can output its input signal without an impedance-related loss. The non-inverting input terminal of the buffer 504 can be coupled to an output terminal of the voltage distribution unit 502, and the inverting input terminal to the output terminal of the buffer 504 as a voltage follower to receive a feedback signal Vwinding' from the output terminal.

The comparator 506 can compare a magnitude of an input signal of the non-inverting input terminal and that of an input signal of the inverting input terminal and output a digital signal of "1" or "0" according to the comparison result. If a signal that is input to the non-inverting input terminal is greater than a signal that is input to the inverting input terminal, the comparator 506 may output "1", and if a signal that is input to the non-inverting input terminal is smaller than a signal that is input to the inverting input terminal, the comparator 506 may output "0". The inverting input terminal of the comparator 506 can be coupled to the output terminal of the buffer 504, and the non-inverting input terminal can be coupled to a reference voltage. Here, the reference voltage can be set to a ground voltage or a voltage that is higher by a predetermined level than the ground voltage.

The signal delay unit 508 can receive the $V_{GS}$ signal, output it with a predetermined delay, invert its phase, and send the inverted $V_{GS}$ signal to the pulse converter 510 and the sampling pulse string generator 514.

The pulse converter 510 can generate a signal that has a short low level interval synchronized with a rising edge of a signal that is input from the inverter 510 and that sustains a high level in a remaining interval. The pulse converter 510 can send the so-generated signal to a set terminal S of the SR latch 512.

A reset terminal R of the SR latch 512 can be coupled to an output terminal of the comparator 506, and a set terminal S thereof can be coupled to an output terminal of the pulse converter 510. The SR latch 512 can be formed with a NAND flip-flop. The SR latch can output a result of a logical operation to the sampling unit 516 and to the sampling signal output controller 520 through a non-inverting output terminal Q.

The sampling pulse string generator 514 can include two pulse string generators 5142 and 5144, and can generate and output first and second sampling pulse strings that are toggled with different timing by the two pulse string generators.

The first and second pulse string generators 5142 and 5144 can be reset in synchronization with a rising edge of the output signal of the signal delay unit 508, where a level of the output signal of the signal delay unit 508 that is input through the reset terminal changes from a low level to a high level. The first and second pulse string generators 5142 and 5144 may generate and output the first and second sampling pulse strings that are toggled with different timing from a reset time. The toggling timing of the first and second sampling pulse strings will be described later. Here, a pulse string can be a pulse group that is continuously toggled with a predetermined frequency. In some embodiments the toggling can be piecewise continuous. In some embodiments the sampling pulse strings generator 514 may include three or more pulse string generators to output three or more sampling pulse strings.

The sampling unit 516 can include first and second AND gates 5162 and 5164 and first and second sample and hold latches 5166 and 5168. The first AND gate 5162 can receive an output signal of the non-inverting output terminal Q of the SR latch 512 and the first sampling pulse string of the first sampling pulse string generator 5142 of the sampling pulse string generator 514, and perform an AND operation. The second AND gate 5164 can receive an output signal of the non-inverting output terminal Q of the SR latch 512 and second sampling pulse string of the second sampling pulse string generator 5144 of the sampling pulse string generator 514, and perform an AND operation.

The first and second sample and hold latches 5166 and 5168 may receive the results of the AND operations of the first and second AND gates 5162 and 5164 through a clock signal input terminal. The first and second sample and hold latches 5166 and 5168 may continue outputting the sample and hold signal when the AND operation results of the first and second AND gates 5162 and 5164 are low levels. When the results of the AND operation of the first and second AND gates 5162 and 5164 change to high levels, the first and second sample and hold latches 5166 and 5168 can sample and hold the current Vwinding' voltage output from the buffer 504.

In various embodiments the number of the AND gates and the sample and hold latches can be larger than two, corresponding to the number of pulse string generators in the sampling pulse strings generator 514.

The selection switch 518 may selectively transmit one of the sampling signals respectively held by the first and second sample and hold latches 5166 and 5168 of the sampling unit 516 to the sampling signal output unit 522.

A terminal of the selection switch 518 can be selectively coupled to an output terminal of the first sample and hold latch 5166 or an output terminal of the second sample and hold latch 5168 according to the switching control signal input from the sampling signal output controller 520. Another terminal of the selection switch 518 can be coupled to a third sample and hold latch 5222 of the sampling signal output unit 522.

The sampling signal output controller 520 can receive the output signal that is output at the non-inverting output terminal Q of the SR latch 512 and the first and second sampling pulse strings of the sampling pulse string generator 514. The sampling signal output controller 520 can generate a switching control signal and a timing signal. The switching control signal can control the selection switch 518 to selectively transmit one of the sampling signals respectively held by the first and second sample and hold latches 5166 and 5168 to the sampling signal output unit 522. The timing signal is a signal for controlling the driving timing of the sampling signal output unit 522.

The sampling signal output unit 522 may include the third sample and hold latch 5222 and a low pass filter 5224.

The third sample and hold latch 5222 can receive the timing signal output from the sampling signal output controller 520 through a clock signal input terminal. The third sample and hold latch 5222 continues to send the sampled and held signal to the low pass filter 5224 when the timing signal output from the sampling signal output controller 520 is the low level. When the timing signal output from the sampling signal output controller 520 changes to the high level, the third sample and hold latch 5222 samples, holds, and sends the sampling signal, input through the selection switch 518, to the low pass filter 5224.

When a level of the signal output from the third sample and hold latch 5222 changes faster than a predetermined frequency, the low pass filter 5224 can generate and send a feedback signal Vfb to the switching controller 400 shown in FIG. 1.

Figure 3:
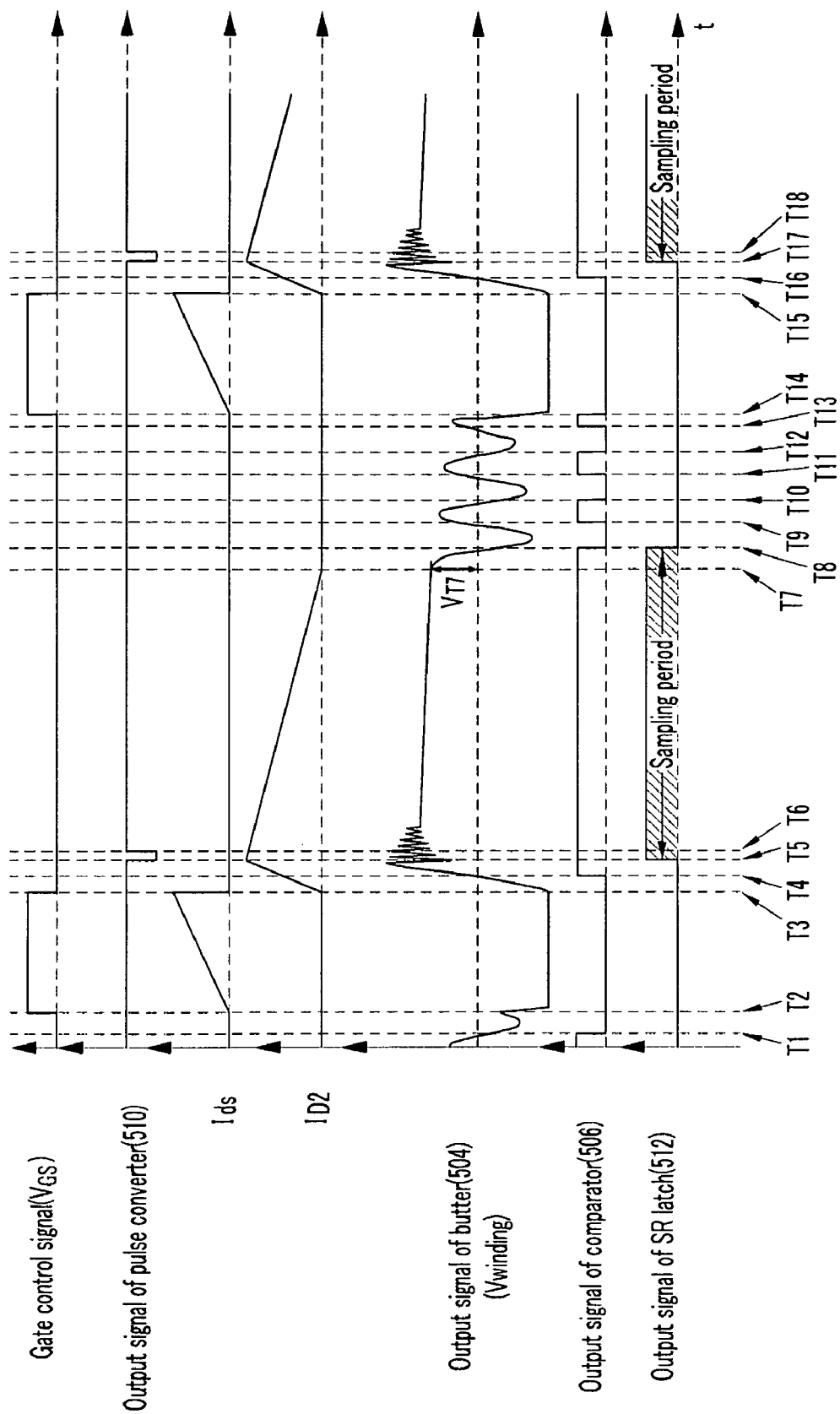
FIG. 3 illustrates output signals of a buffer, a comparator, a pulse converter, and an SR latch in accordance with the change of VGS, Ids, and ID2.

FIG. 3 illustrates output signals of the buffer 504, the comparator 506, the pulse converter 510, and the SR latch 512 as well as the waveforms of $V_{GS}$, Ids, and ID2 signals. In what follows, the terminology "high" and "low" will be used. These terms are meant to make a connection to digital terminology. In different embodiments the associated actual voltage levels may be different. Also, these high level and low level signals may vary in time to some limited degree. In some embodiments they are only defined with a tolerance to be recognized as digital high and low signals. ID2 denotes a current flowing through the diode D2.

The primary coil L1 of the transformer and an output capacitor Coss between a drain and a source of the switching transistor Qsw can generate a resonant signal as the switching transistor Qsw is turned on and off substantially periodically. Because coils L1 and L3 share the core of the transformer, the Vwinding voltage also follows a resonant waveform. Thereby, at the time T1, a signal that is output by the buffer 504 also generates a resonance waveform. At this time T1, the gate control signal $V_{GS}$, output by the switching controller 400, can be in a low level state. Further, also at time T1 the output voltage of the buffer 504 can fall to a reference voltage or less, thus an output signal of the comparator 506, which compares the reference voltage with the output signal of the buffer 504 can also change from a high level to a low level. Accordingly, an output signal of the non-inverted output terminal Q of the SR latch 512 having an output signal of the comparator 506 as an input signal of the reset terminal R and an output signal of the pulse converter 510 as an input signal of the set terminal S sustains a low level.

At time T2, the $V_{GS}$ signal can change from low to high and therefore the switching transistor Qsw is turned on. The turning on of the switching transistor Qsw can disrupt the resonance of the L1-Coss resonator and the resonant waveform of the Vwinding voltage, and therefore the output voltage of the buffer 504. Thus the output voltage of the buffer 504 may become low, e.g. lowered by a predetermined level below the reference voltage Vref. Further, at time T2 the current Ids may start to increase.

At time T3, the $V_{GS}$ signal can become low and the switching transistor Qsw is turned off. The output voltage of the buffer 504 may begin to rise, and the current of the diode D2 may begin to increase.

At time T4, the output voltage of the buffer 504 can exceed the reference voltage Vref, whereby the output signal of the comparator 506 can change from low to high. However, the output signal of the pulse converter 510 does not necessarily change because of the signal delay caused by the inverter 510 and the pulse converter 510.

At time T5, the output signal of the pulse converter 510 may change from high to low, changing the input signal at the set terminal S of the SR latch 512, and thus the output signal of the non-inverted output terminal Q of the SR latch 512 can change from low to high. At this time Is begins to decrease.

At time T6, the output signal of the pulse converter 510 can change from low to high, while the input at the R terminal of the SR latch 512 can remain high. Thus, the output signal of the non-inverted output terminal Q of the SR latch 512 may remain high.

At time T7, the current ID2, which has decreased since the time T4, can reach approximately zero. This can restart the resonance of Vwinding and hence the output voltage of the buffer 504.

At time T8, the output voltage of the buffer 504 may falls to, or below, the reference voltage Vref in the course of the resonant time dependence. Accordingly, the output signal of the comparator 506 can change from high to low, whereby the output signal of the non-inverted output terminal Q of the SR latch 512 can change to low.

In the subsequent interval T9 to T13, the output voltage of the buffer 504 can repeatedly oscillate above and below the reference voltage Vref, and thus the output signal of the comparator 506 can repeatedly fluctuate between high and low. During this interval the output signal of the non-inverted output terminal Q of the SR latch 512 may remain low, because the S input remains high. From time T14 the signals repeat the waveforms starting at T1.

Next, the generation of the feedback signal Vfb of the feedback signal generator 500 during the interval T3 to T8 will be described in detail.

First, a drain-source "Vds voltage" that is applied between the drain and source of the switching transistor Qsw is substantially equal to the sum of the DC voltage Vin that is applied to the capacitor Cin and the voltage that is generated in the primary coil L1 of the transformer.

As the switching transistor Qsw is turned off, a voltage of the output capacitor Coss between the drain terminal and the source terminal of the switching transistor Qsw can increase until a direction of a current flowing to the primary coil L1 of the transformer changes. As the direction of a current flowing to the primary coil L1 of the transformer changes, resonance can be generated by the resonator of the output capacitor Coss and a leakage inductance component of the primary coil L1 of the transformer, whereby the Vds voltage exhibits a resonant waveform within a predetermined voltage range with a predetermined period.

As the switching transistor Qsw is turned off, a voltage that has a polarity opposite when the switching transistor Qsw is turned on, can be generated in the secondary coil L2 of the transformer. This induces a current in the secondary coil L2.

When the current of coil L2 flows to the capacitor C1 via the diode D1, the voltage in the secondary coil L2 falls by a predetermined level.

This decreasing voltage is reflected from the secondary coil L2 to the primary coil L1, causing the Vds voltage to fall. During this interval, the voltage that is reflected from the secondary coil L2 to the primary coil L1 of the transformer is substantially the same as a sum of the voltage of the diode D1 and the voltage of the capacitor C1.

The Vds voltage can fall in proportion to an amount of current flowing through the diode D1. When the current flowing to the diode D1 becomes substantially zero, Vds exhibits a resonant waveform because of the resonance of the primary coil L1 and the output capacitor Coss. The resonance starts substantially at time T7. At time T7, the voltage that is reflected from the secondary coil L2 to the primary coil L1 is approximately proportional to the output voltage Vo, and also appears across the capacitor C1, as shown in Equation 1:

$$\frac{n_{PRIMARY}}{n_{SEC}} \cdot V_o = V_o' \tag{1}$$

Here $n_{PRIMARY}$ is a number of windings of the primary coil L1, $n_{SEC}$ is a number of windings of the secondary coil L2, Vo is the output voltage, and Vo' is the voltage that is reflected from the secondary coil L2 to the primary coil L1.

The Vds voltage at time T7 is substantially the same as a sum of a DC voltage Vin and the reflected voltage Vo'. The Vwinding voltage that is induced in the coil L3 is lower than Vds voltage by the DC voltage Vin at time T7. At this time, the Vwinding voltage is proportional to a winding number ratio of the coil L3 and the secondary coil L2, as shown in Equation 2:

$$\frac{n_{VCC}}{n_{SEC}} \cdot V_o = V_o'' \tag{2}$$

Here $n_{vCC}$ is a number of windings of the coil L3 and Vo" is the voltage reflected from the secondary coil L2 to the primary coil L1. The Vwinding voltage can be proportional to the reflected voltage Vo". The winding number ratio among the coils L1, L2, and L3 is predetermined. A precise value of the voltage Vo can be detected at time T7, and the voltage Vo is proportional to the Vwinding voltage through Equations (1)-(2).

The winding number ratio between the primary coil L1, the secondary coil L2, and the coil L3 of the transformer is a preset value, and the output voltage Vo can be seen through a Vwinding voltage that is induced from the primary coil L1 to the secondary coil L3 of the transformer at the time T7.

The feedback signal generator 500 can receive the Vwinding voltage and the $V_{GS}$ signal and output the feedback signal Vfb that corresponds to the Vwinding' signal that is proportional to the Vwinding voltage about the time T7. The switching controller 400 can receive the feedback signal Vfb and compare the feedback signal Vfb to the sense voltage Vsense to adjust the duty or on-time of the switching transistor Qsw, thereby controlling the output voltage Vo.

Within time interval T2-T14, the full period of the switching transistor Qsw, the output signal of the SR latch 512 can remain high in the T5-T8 interval. This interval is a sampling period in which the first sample and hold latch 5166 may sample the output signal of the buffer 504 whenever a signal level of the sampling pulse string that is input from the first sampling pulse string generator 5142 becomes high. The second sample and hold latch 5168 may sample the output signal of the buffer 504 whenever a signal level of the sampling pulse string that is input from the second sampling pulse string generator 5144 becomes high. Hereinafter, a period for maintaining the output signal of the SR latch 512 on a high level so that the first and second sample and hold latches 5166 and 5168 perform a sampling operation will be referred to as a sampling period.

During the sampling period, the first sample and hold latch 5166 can sample the Vwinding' voltage output through the buffer 504 whenever the first sampling pulse strings become a high level (i.e., whenever the sampling pulse in the first sampling pulse strings is input). The second sample and hold latch 5168 can sample the Vwinding' voltage output through the buffer 504 whenever the sampling pulse in the second sampling pulse strings is high input.

During the sampling period, the sampling signal output controller 520 can maintain a timing signal applied to the clock signal input terminal of the third sample and hold latch 5222, and therefore maintain the feedback signal Vfb that is output from the sampling signal output unit 522.

At time T8, when the output signal of the non-inverted output terminal Q of the SR latch 512 can change from high to low, the sampling signal output controller 520 may sense that a sampling period has ended. After the sampling period is finished, the sampling signal output controller 520 can control the selection switch 518 to selectively transmit one of the sampling signals held by the first and second sample and hold latches 5166 and 5168 to the third sample and hold latch 5222. Simultaneously, the sampling signal output controller 520 can change a level of a timing signal that is input to the clock signal input terminal of the third sample and hold latch 5222 to a high level, and therefore the third sample and hold latch 5222 may hold the sampling signal that is input through the selection switch 518. The low pass filter 5224 receives the changed sampling signal from the third sample and hold latch 5222 to generate the feedback signal Vfb, and therefore the feedback signal Vfb is changed.

A method for selecting the sampling signal to be transmitted to the third sample and hold latch 5222 among the sampling signals held by the first and second sample and hold latches 5166 and 5168 will now be described with reference to FIG. 4. P1 and P2 respectively denote the first and second sampling pulse strings. A and C respectively denote the sampling pulses in the first sampling pulse strings, and B and D respectively denote the sampling pulses in the second sampling pulse strings. a, b, c, and d respectively denote voltage levels of the Vwinding' voltage sampled by using the sampling pulses A, B, C, and D. $V_{T7}$ denotes a voltage level of the Vwinding' voltage at time T7. The sampling pulses A, B, C, and D are part of the first and second sampling pulse strings around time T7. The sampling pulse C is the sampling pulse closest to time T8 among the sampling pulses in the first sampling pulse string P1. The sampling pulse D is the sampling pulse closest to time T8 among the sampling pulses in the second sampling pulse string P2. In some embodiments, sampling pulse D is closer to time T8 than the sampling pulse C.

Figure 4:
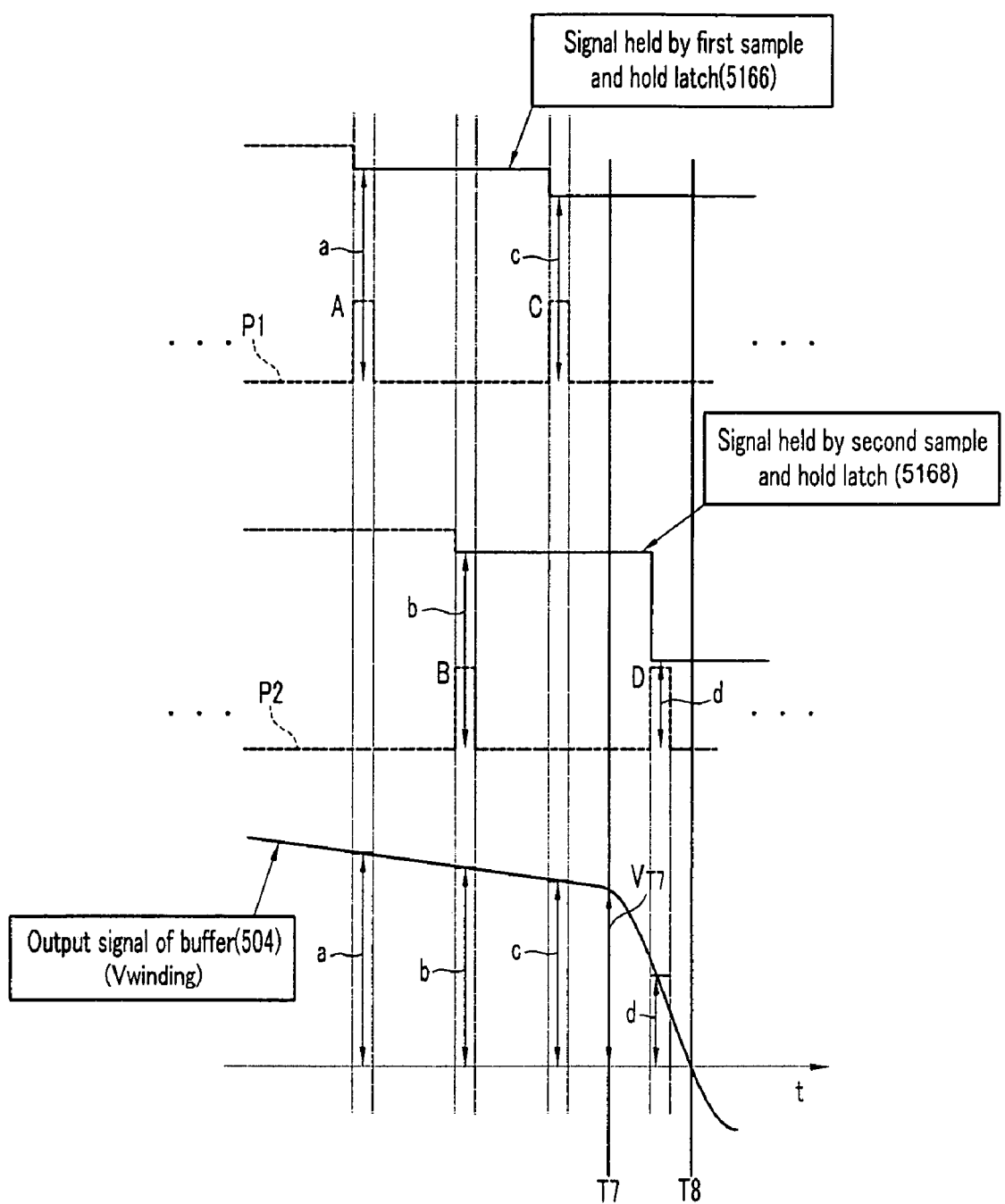
FIG. 4 is diagram representing signals held by first and second sample and hold latches and of the feedback signal generator.

FIG. 4 represents signals held by the first and second sample and hold latches 5166 and 5168 of the feedback signal generator 500. At time T8 when the sampling period ends, the sampling signals respectively held by the first and second sample and hold latches 5166 and 5168 are signals c and d that are sampled by using the sampling pulses C and D. The sampling signal output controller 520 can send the sampling signal c that is sampled by using the sampling pulse C that is previous to the sampling pulse D to the sampling signal output unit 522. The sampling signal output controller 520 can select the sampling signal c rather than the sampling signal d to sample the Vwinding' voltage that has an approximate value of the voltage level $V_{T7}$ of the Vwinding' voltage. At time T7 when a current flowing through the diode D1 becomes zero, the output voltage Vo can reflect the voltage induced in the secondary coil L2 of the transformer by the primary coil L1 of the transformer, which is well known to a person of ordinary skill in the art. However, since the diode D1 is a passive element, there is no method for detecting time T7 where the current flowing through the diode D1 is zero. Therefore, the Vwinding' voltage corresponding to the output voltage Vo may not be sampled at time T7. Resonance between the inductance of the primary coil L1 of the transformer and the output capacitor Coss may begin at time T7, and the Vwinding' voltage steeply decreases between time T7 and time T8. Therefore, a voltage difference between the sampling signal d that is sampled by the sampling pulse D between time T7 and time T8 and the $V_{T7}$ voltage can be considerably higher than a voltage difference between the sampling signal c that is sampled by the sampling pulse C prior to time T7 and the $V_{T7}$ voltage.

Like the sampling pulse D, the sampling pulse that is just prior to time T8 among the sampling pulses in the first and second sampling pulse strings may fall between time T7 and time T8. As seen in FIG. 4, a sampling voltage d sampled by the sampling pulse D has a big difference relative to the Vwinding' voltage at time T7. Therefore, the sampling signal output controller 520 can operate to select a sampling signal c held by the first sample and hold latch 5166, to prevent sampling the sampling voltage d that is considerably different from the Vwinding' voltage at time T7.

Therefore, the sampling signal output controller 520 can store information respectively corresponding to the first and second sample and hold latches 5166 and 5168 in the first and second sampling pulse string generators 5142 and 5144. The sampling signal output controller 520 may determine where the sampling pulse that is input before time T8 among the first and second sampling pulse strings that are respectively input from the first and second sampling pulse string generators 5142 and 5144 is input among the sampling pulse strings. When the sampling pulse D in the second sampling pulse string P2 is input just before time T8, as shown in FIG. 4, the sampling signal output controller 520 can control the selection switch 518 based on the corresponding information to transmit the sampling signal c that is held by the first sample and hold latch 5166, corresponding to the first sampling pulse string generator 5142, to the sampling signal output unit 522.

Next, a method for realizing the sampling operation when the sampling pulse strings generator 514 includes three or more pulse string generators will now be described.

The sampling signal output controller 520 can include sampling pulse string input terminals corresponding to the number of sampling pulse string generators. The sampling signal output controller 520 can receive the sampling pulse strings output from respective sampling pulse string generators through respective input terminals.

The sampling signal output unit can store two types of corresponding information. The sampling signal output unit can store a first corresponding information in which the plurality of pulse string generators respectively correspond to the plurality of pulse string input terminals. Further, the second corresponding information in which the plurality of sampling pulse string generators respectively correspond to the plurality of sample and hold latches.

The sampling signal output controller 520 can store an order for receiving the sampling pulse through the plurality of sampling pulse string input terminals for every sampling period. Based on the stored order, the sampling signal output controller 520 can search the sampling pulse string input terminal corresponding to a previous order of the sampling pulse string input terminal to which the sampling pulse is input at a time previous to time T8 when the sampling period ends. The sampling signal output controller 520 can control the selection switch 518 to transmit the signal held by the output terminal of the sample and hold latch corresponding to the searched sampling pulse string input terminal to the sampling signal output unit 522.

Figure 5A:
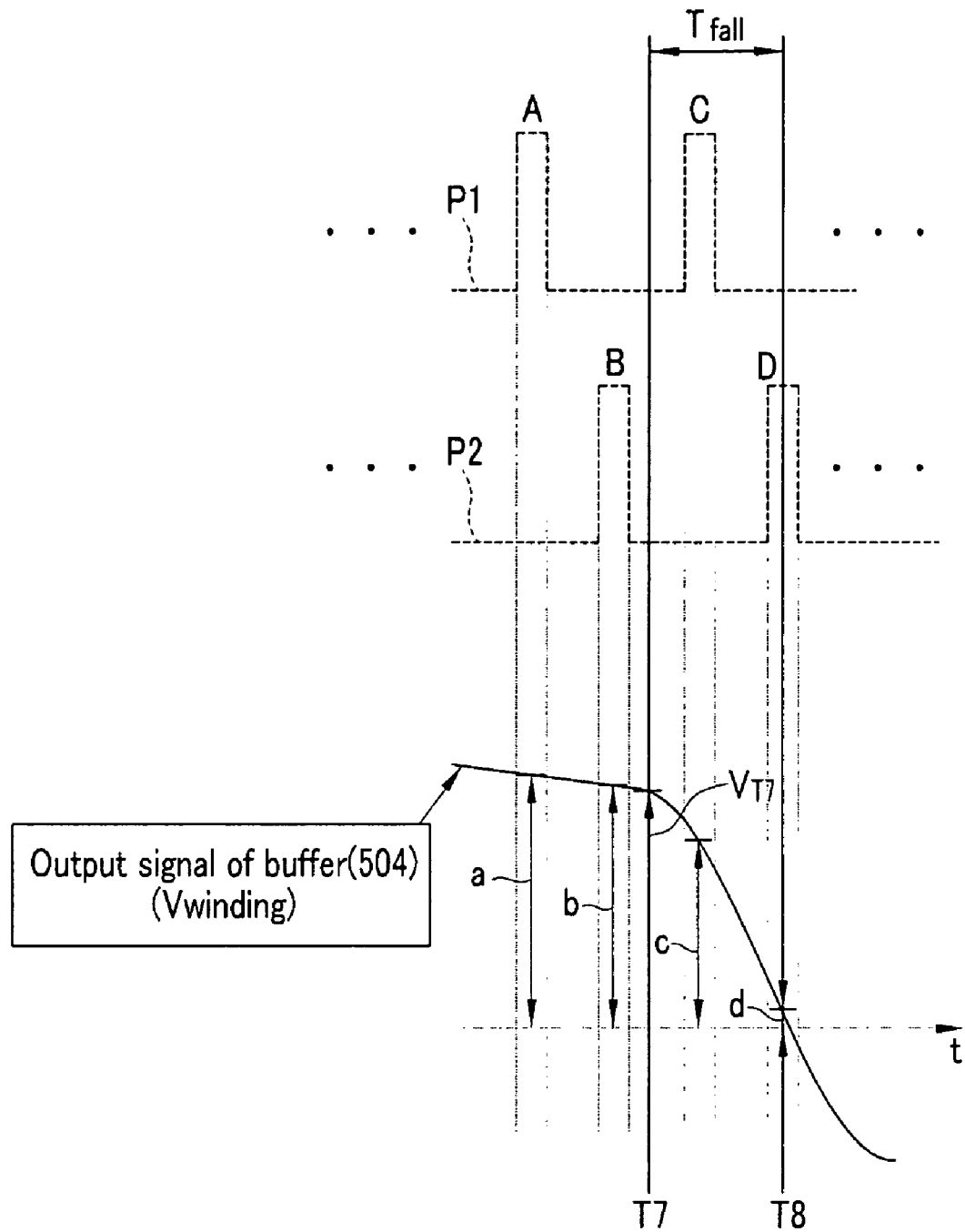
FIG. 5A shows a diagram representing a minimum interval limitation condition between a sampling pulse in first sampling pulse strings generated by a first sampling pulse string generator and a sampling pulse in second sampling pulse strings generated by a second sampling pulse string generator.

In FIG. 5A, a minimum interval limitation condition between the sampling pulse in the first sampling pulse strings generated by the first sampling pulse string generator 5142 and the sampling pulse in the second sampling pulse strings generated by the second sampling pulse string generator 5144 will be described.

In FIG. 5A, the sampling pulse D is positioned before time T8, the end of the sampling period. In this case, the sampling signals respectively held by the first and second sample and hold latches 5166 and 5168 at time T8 are the sampling signals c and d, and the sampling signal transmitted to the third sample and hold latch 5222 according to the control of the sampling signal output controller 520 is the sampling signal c.

However, the voltage difference between the sampling signal c and the voltage $V_{T7}$ of the Vwinding' voltage at time T7 is greater than the voltage difference between the sampling signal b and the voltage $V_{T7}$ of the Vwinding' voltage at time T7. Therefore, the sampling signal b that is sampled by the sampling pulse B approximates the voltage $V_{T7}$ better than the sampling signal c that is sampled by the sampling pulse C. Therefore, in some embodiments, an interval between the sampling pulse in the first sampling pulse strings generated by the first sampling pulse string generator 5142 and the sampling pulse in the second sampling pulse strings generated by the second sampling pulse string generator 5144 is established to be greater than a period Tfall between time T7 and time T8.

Figure 5B:
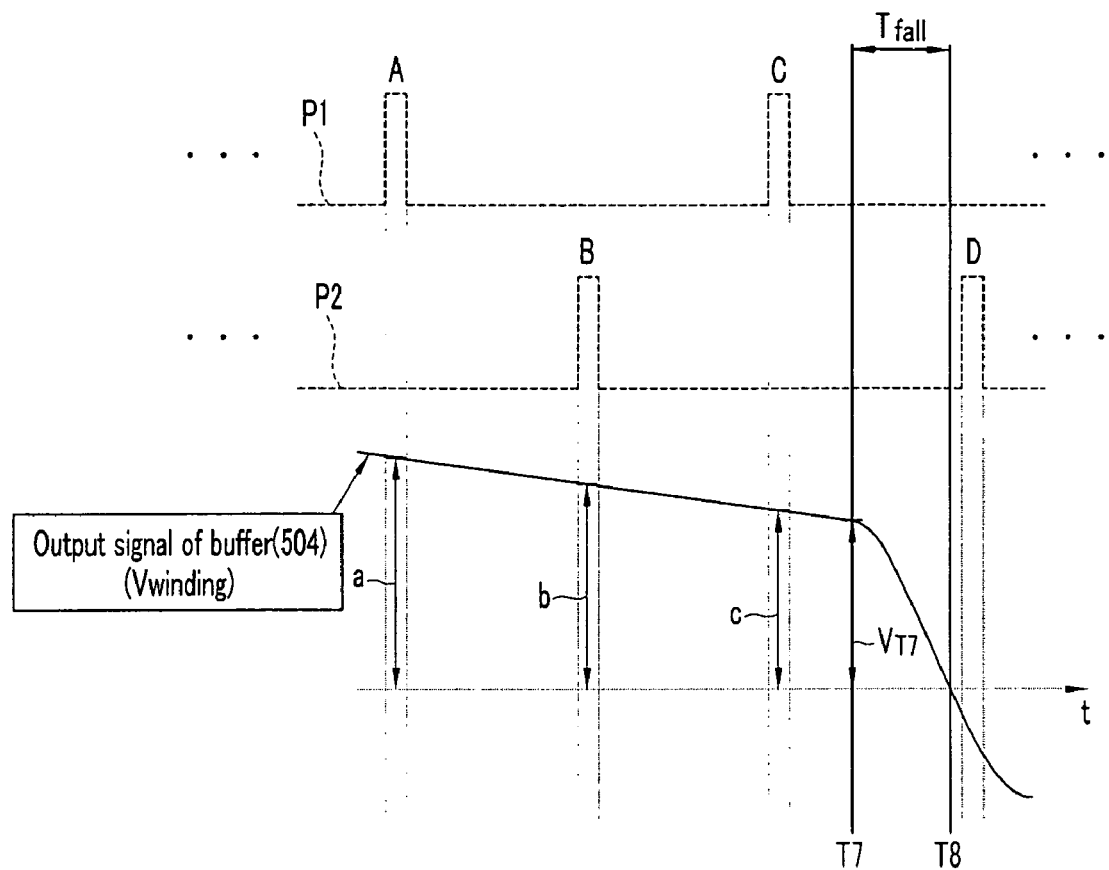
FIG. 5B shows a diagram representing a maximum interval limitation condition between the sampling pulse in the first sampling pulse strings generated by the first sampling pulse string generator and the sampling pulse in the second sampling pulse strings generated by the second sampling pulse string generator.

In FIG. 5B, a maximum interval limitation condition between the sampling pulse in the first sampling pulse strings generated by the first sampling pulse string generator 5142 and the sampling pulse in the second sampling pulse strings generated by the second sampling pulse string generator 5144 will be described.

In FIG. 5B, the sampling pulse D is positioned after time T8, the end of the sampling period. In addition, an interval between the sampling pulse in the first sampling pulse strings and the sampling pulse in the second sampling pulse strings is greater than Tfall, thus satisfying the minimum interval limitation condition between the sampling pulses shown in FIG. 5A.

In this case, the sampling signals respectively held by the first and second sample and hold latches 5166 and 5168 at time T8 can be the sampling signals c and b, and the sampling signal transmitted to the third sample and hold latch 5222 according to the control of the sampling signal output controller 520 is the sampling signal b.

However, as shown in FIG. 5B, there can be a problem in that the sampling signal b can have a voltage level that is greater than the voltage level $V_{T7}$ of the Vwinding' voltage at time T7 by a voltage that is greater than a predetermined level. That is, the interval between the sampling pulse in the sampling pulse strings generated by the first sampling pulse string generator 5142 and the sampling pulse in the second sampling pulse strings generated by the second sampling pulse string generator 5144 is required to be established to be greater than Tfall, but close to Tfall.

Figure 6A:
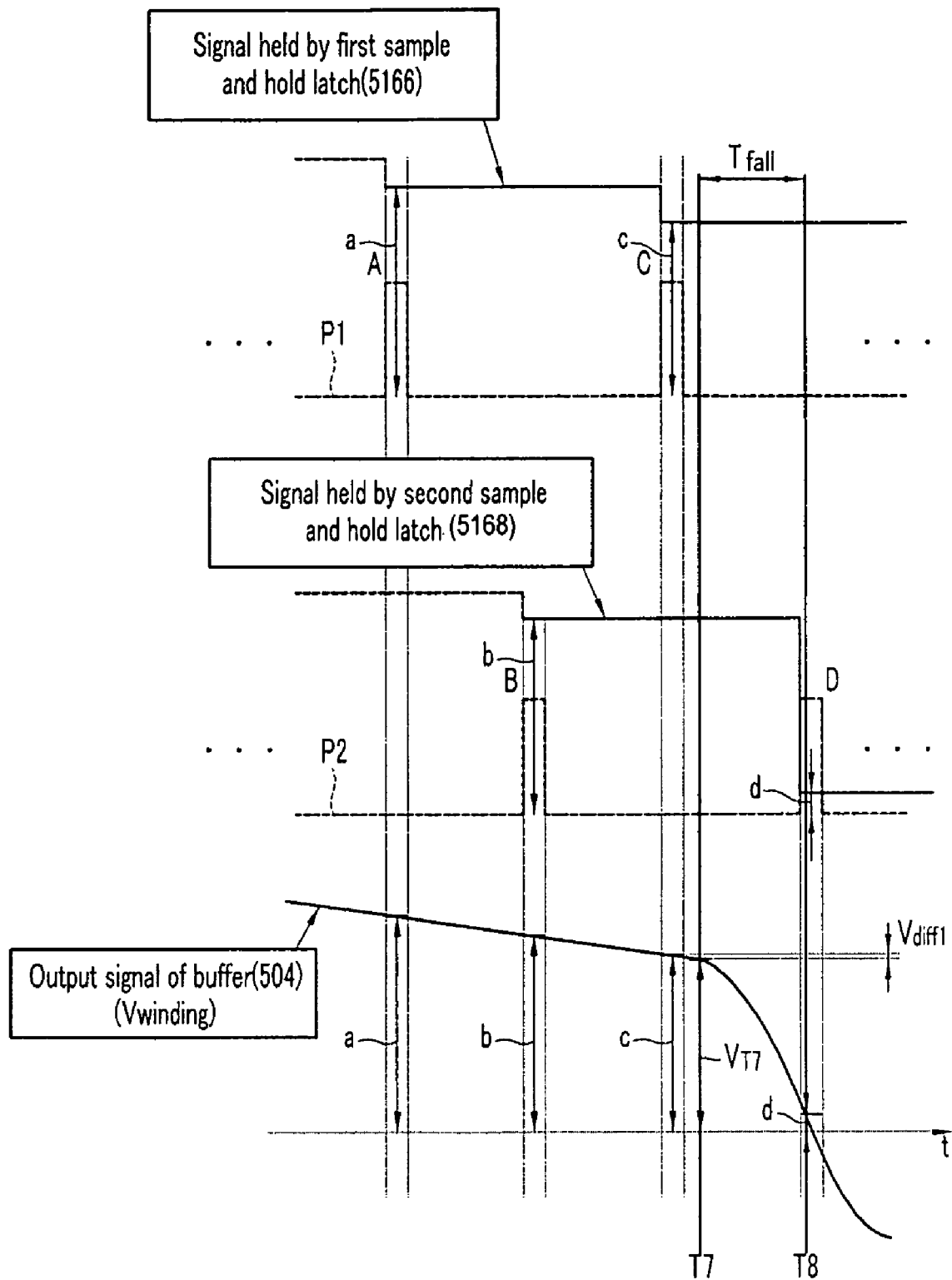
FIG. 6A and FIG. 6B respectively show a minimum value and a maximum value of a voltage difference between a sampling signal and a voltage level VT7 when an interval between the sampling pulse in the first sampling pulse strings generated by the first sampling pulse string generator and the sampling pulse in the second sampling pulse strings generated by the second sampling pulse string generator satisfies minimum and maximum interval limitation conditions shown in FIG. 5A and FIG. 5B.
Figure 6B:
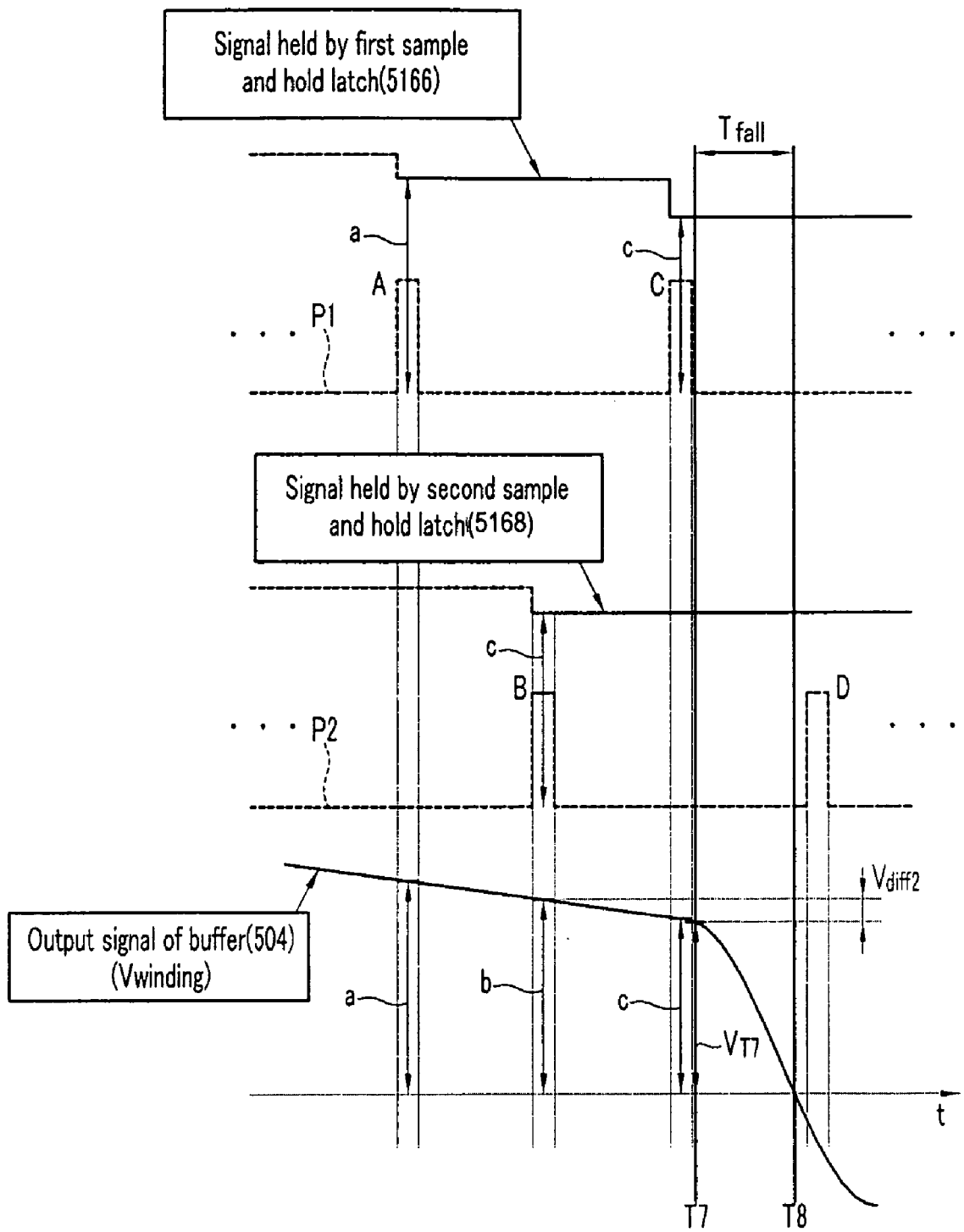

FIG. 6A and FIG. 6B respectively show a minimum value and a maximum value of the voltage difference between the sampling signal and the voltage level VT7 when the interval between the sampling pulse in the first sampling pulse strings and the sampling pulse in the second sampling pulse strings satisfies the minimum and maximum interval limitation conditions shown in FIG. 5A and FIG. 5B.

FIG. 6A illustrates the case when the sampling pulse D is positioned before time T8, the end of the sampling period. In this case, the sampling signals respectively held by the first and second sample and hold latches 5166 and 5168 at time T8 can be the sampling signals c and d, and the sampling signal transmitted to the third sample and hold latch 5222 according to the control of the sampling signal output controller 520 can be the sampling signal c.

As shown in FIG. 6A, when the sampling pulse D is positioned before time T8, a voltage difference Vdiff1 between the sampling signal and the voltage level VT7 of the Vwinding' voltage at time T7 is minimized.

FIG. 6B shows that when the sampling pulse D is positioned after time T8, the sampling signals respectively held by the first and second sample and hold latches 5166 and 5168 at time T8 can be the sampling signals c and b, and the sampling signal transmitted to the third sample and hold latch 5222 according to the control of the sampling signal output controller 520 can be the sampling signal b.

As shown in FIG. 6B, when the sampling pulse D is positioned after time T8, a voltage difference Vdiff2 between the sampling signal and the voltage level $V_{T7}$ of the Vwinding' voltage at time T7 is maximized.

The interval T2 to T3 shown in FIG. 3 varies according to the voltage Vin applied to the capacitor Cin and a size of output terminal load Po of the output unit 200. For this reason, it is not easy to estimate whether the sampling pulses of the first and second pulse strings are positioned before or after time T8. Therefore, the voltage difference between the sampling signal transmitted to the third sample and hold latch 5222 and the voltage level $V_{T7}$ may vary from the minimal Vdiff1 voltage to the maximal Vdiff2 voltage, or may vary from the maximal Vdiff2 voltage to the minimal Vdiff1 voltage.

The waveform of the feedback signal Vfb generated by the feedback signal generator 500 when the voltage level of the sampling signal steeply varies will now be described with reference to FIG. 7.

Figure 7:
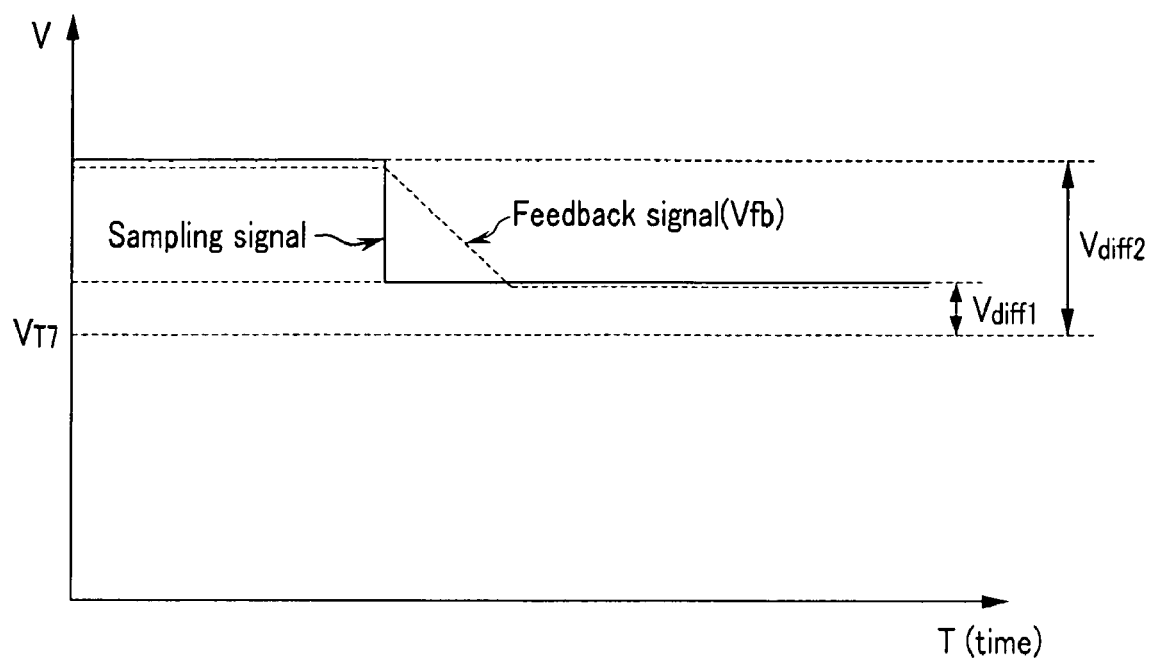
FIG. 7 shows a steep variation of the voltage level of the sampling signal and a corresponding variation of a feedback signal Vfb when the voltage level VT7 of the Vwinding' voltage at time T7 is maintained at a predetermined level.

FIG. 7 shows a steep variation of the voltage level of the sampling signal and a corresponding variation of the feedback signal Vfb when the voltage level $V_{T7}$ is maintained at a predetermined level. In FIG. 7, the voltage difference between the sampling signal and the voltage level $V_{T7}$ steeply varies from the Vdiff2 voltage to the Vdiff1 voltage. The feedback signal generator 500 may generate a corresponding feedback signal Vfb by filtering the sampling signal by the low pass filter 5224, shown as a dashed line.

As shown in FIG. 7, while the voltage level $V_{T7}$ is maintained at a predetermined level, the feedback signal Vfb may vary by a voltage of (Vdiff2−Vdiff1). Correspondingly, while the output voltage Vo is maintained at a predetermined level, the feedback signal Vfb varies, and therefore a turn-off time of the switching transistor Qsw may vary.

To solve this problem, the signal delay unit 508 randomly varies and delays the gate control signal VGS, which will be described with reference to FIG. 8.

Figure 8:
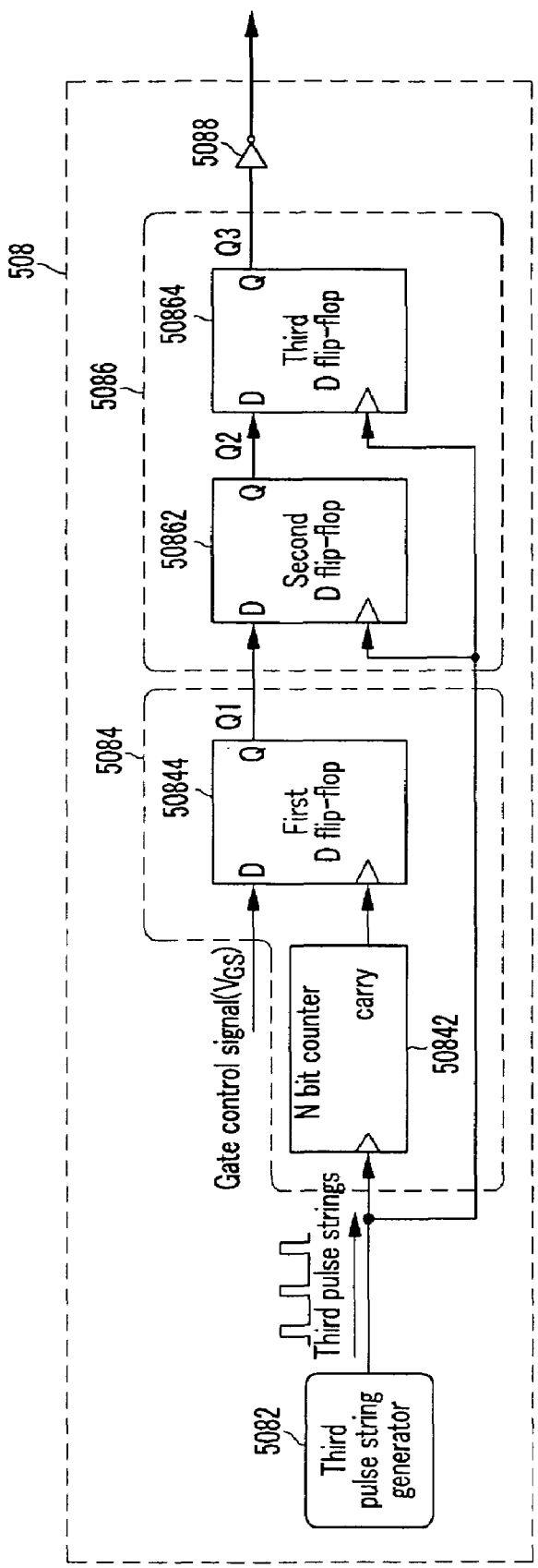
FIG. 8 is a block diagram representing a signal delay unit.

FIG. 8 is a block diagram representing the signal delay unit 508. The signal delay unit 508 can include a third pulse string generator 5082, a variable delay unit 5084, a fix delay unit 5086, and an inverter 5088.

The third pulse string generator 5082 may generate third pulse strings that oscillate by a predetermined frequency.

The variable delay unit 5084 can randomly delay the gate control signal VGS. It can include an N bit counter 50842 and a first D flip-flop 50844.

The N bit counter 50842 can store N bits. The counter value may increase by one whenever the third pulse string, generated by the third pulse string generator 5082 and input through the clock signal input terminal, becomes a high level. The N bit counter 50842 also changes a carry signal to 1 when all N bits become 1.

The number N can be greater than 2. The case when N is 3, i.e. the N bit counter 50842 operating as a 3 bit counter, will be described with reference to FIG. 9.

FIG. 9 illustrates that a bit value of the N bit counter 50842 can be initially set to "000". The bit value of the N bit counter 50842 can be increased by 1 whenever the third pulse string becomes high, raising the bit value from "000" to "111" in steps. The carry signal of the N bit counter 50842 is maintained at low while the bit value is increased from "000" to "110", and it is changed from low to high when the bit value changes to "111". The carry signal is maintained on high until the bit value is changed back to "000".

The first D flipflop 50844 can receive the carry signal output from the N bit counter 50842 through the clock signal input terminal. The first D flipflop 50844 may keep sending the gate control signal VGS from its non-inverted output terminal Q as output signal Q1 to a data input terminal D of the fix delay unit 5086 when the carry signal is low. When the carry signal changes to high, the first D flipflop 50844 can store the gate control signal VGS, and transmit the stored gate control signal VGS to the fix delay unit 5086 through its non-inverted output terminal Q.

The fix delay unit 5086 may include second and third D flipflops 50862 and 50864. The second D flipflop 50862 can receive the third pulse string, output by the third pulse string generator 5082, through its clock signal input terminal. The second D flipflop 50862 can receive the output signal Q1, output by the first D flip-flop 50844, through its Data input terminal D. The second D flipflop 50862 can transmit the output signal of the first D flipflop 50844 through its non-inverted output terminal Q as output signal Q2 when the third pulse string is low. When the third pulse string is high, the second D flipflop 50862 can store the output signal of the first D flipflop 50844, and transmit it to the third D flipflop 50864 through the non-inverted output terminal Q.

The third D flipflop 50864 may receive the third pulse string through its clock signal input terminal. The third D flipflop 50864 continues to transmit the output signal Q2 of the second D flipflop 50862, input through its data input terminal D, from its non-inverted output terminal Q as output signal Q3, to the inverter 5088, when the third pulse string is low. When the third pulse string change to high, the third D flip-flop 50864 may store the output signal of the second D flipflop 50862, and transmit it to the inverter 5088 through the non-inverted output terminal Q.

The fix delay unit 5086 can delay the gate control signal VGS by a time corresponding to the number of D flipflops in the fix delay unit 5086.

The inverter 5088 may reverse a phase of the output signal Q3 of the fix delay unit 5086 when transmitting it to the pulse converter 510.

Figure 10:
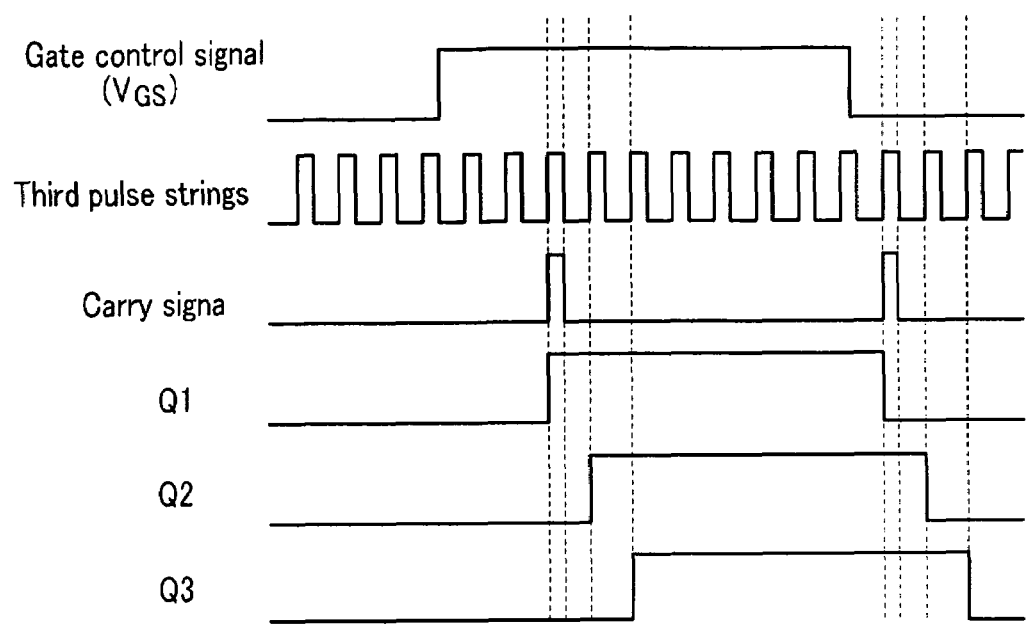
FIG. 10 shows a waveform diagram representing an operation of the signal delay unit.

FIG. 10 shows a waveform diagram to describe an operation of the signal delay unit 508. In FIG. 10, Q1 to Q3 respectively denote output signals of the first to third D flipflops 50844, 50862, and 50864.

First, since the gate control signal VGS can be high when the carry signal output of the N bit counter 50842 changes to high, the level of the signal stored in the first D flipflop 50844 may change to high, and simultaneously, the output signal Q1 of the first D flipflop 50844 may change to high. When the output signal Q1 of the first D flipflop 50844 changes to high, the signal level stored in the second D flipflop 50862 can become high in synchronization with a rising edge of the third pulse string, and simultaneously, the output signal Q2 of the second D flipflop 50862 can change to high. As the output signal Q2 of the second D flipflop 50862 changes to high, the signal stored in the third D flipflop 50864 may change to high in synchronization with the rising edge of the third pulse string, and simultaneously, the output signal Q3 of the third D flipflop 50864 may change to high.

When the gate control signal VGS changes to low, the output signal Q1 of the first D flipflop 50844 may change to low when the carry signal changes to high, and the respective output signals Q2 and Q3 of the second and third D flipflops 50862 and 50864 can sequentially change to low.

The inverter 5088 can reverse a phase of the output signal Q3 of the third D flipflop 50864 and transmit it to the pulse converter 510. The pulse converter 510 may have a short low interval in synchronization with the rising edge of the signal that is input from the signal delay unit 508, and maintain a high signal in other intervals. The output signal of the pulse converter 510 can vary at a time that is delayed by a time for transmitting the signal through the inverter 5088 at a falling edge where the signal Q3 is output to the inverter 5088.

Since the third pulse string can have a predetermined frequency regardless of a level variation of the gate control signal VGS, a time for varying the level of the carry signal output from the N bit counter 50842 to the high level after the gate control signal VGS is changed to the low level can randomly change with respect to the gate control signal VGS. Therefore, since a time for changing the output signal Q3 of the third D flipflop 50864 to the low level may randomly vary, the time interval T3 to T5 may randomly vary to correspond to a time for varying the output signal Q3 of the third D flipflop 50864 to the low level.

The first and second pulse string generators 5142 and 5144 may be reset in synchronization with the rising edge of the output signal of the signal delay unit 508, and generate the first and second sampling pulse strings that are toggled with different timing from the reset time. Here, since the time for varying the output signal Q3 of the third D flipflop 50864 may randomly vary with respect to the gate control signal VGS, a time for varying the output signal of the signal delay unit 508 from the low level to the high level may randomly vary. Therefore, a time for resetting the first and second pulse string generators 5142 and 5144 may randomly vary, and a toggling time of the first and second sampling pulse strings may vary as well. Accordingly, the timing of the sampling pulses in the first and second sampling pulse strings may vary. When the timing of the sampling pulses in the first and second sampling pulse strings are varied, the timing of the sampling pulse positioned before the time T8 may randomly vary, and the voltage difference between the sampling signal transmitted to the third sample and hold latch 5222 and the voltage level $V_{T7}$ may vary continuously. Here, the voltage difference between the sampling signal and the voltage level $V_{T7}$ may vary within a range between a minimum of Vdiff1 voltage and a maximum of Vdiff2 voltage.

Hereinafter, a variation of the feedback signal Vfb generated by the feedback signal generator 500 according to a continuous variation of the voltage difference between the sampling signal and the voltage level $V_{T7}$ will be described.

Figure 11:
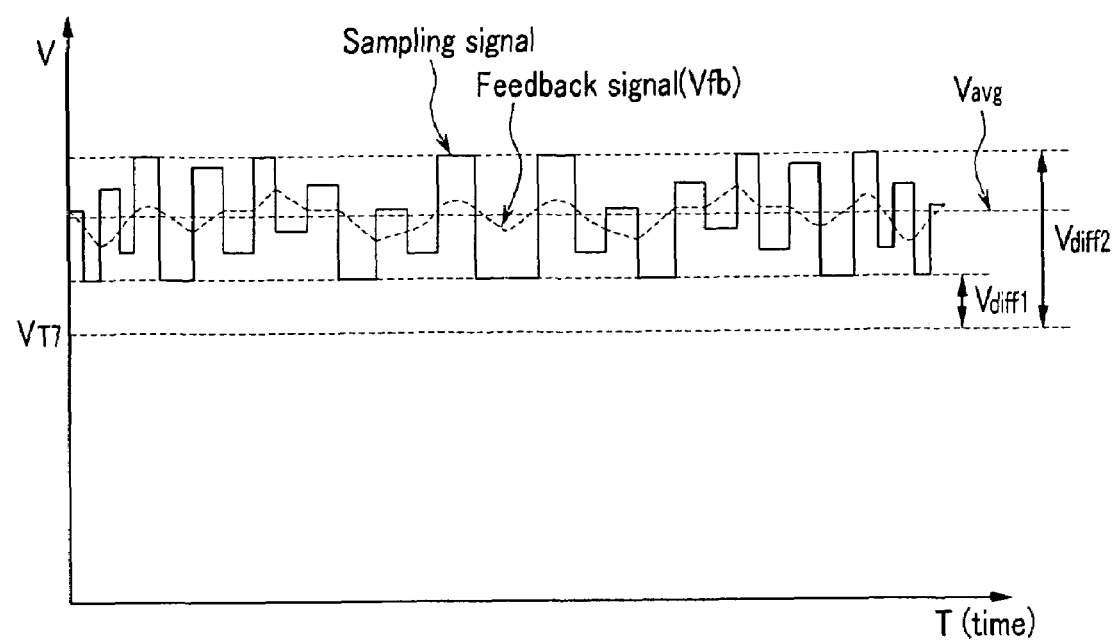
FIG. 11 is a diagram representing the feedback signal Vfb generated by the feedback signal generator when the voltage level VT7 of the Vwinding' voltage at time T7 is maintained at a predetermined level.

FIG. 11 is a diagram representing the feedback signal Vfb generated by the feedback signal generator 500 when the voltage level $V_{T7}$ is maintained at a predetermined level.

The feedback signal Vfb can have a value that is approximately equal to a Vavg voltage obtained by adding the voltage level $V_{T7}$ to an average value ((Vdiff2−Vdiff1)/2) of the voltage difference between the sampling signals. That is, representing a situation different form FIG. 7, when the voltage $V_{T7}$ is maintained at a predetermined level, a width of variation of the feedback signal Vfb may be narrow, and a level of the feedback signal Vfb may approximate the Vavg voltage well. Therefore, an erroneous operation for varying the feedback signal Vfb and a turn-off time of the switching transistor Qsw may be prevented.

The feedback signal generating method may be used in an isolated SMPS that is different from that of FIG. 1, and it may be used in a non-isolated SMPS. A configuration of the non-isolated SMPS using the feedback signal generating method will now be described with reference to FIG. 12.

Figure 12:
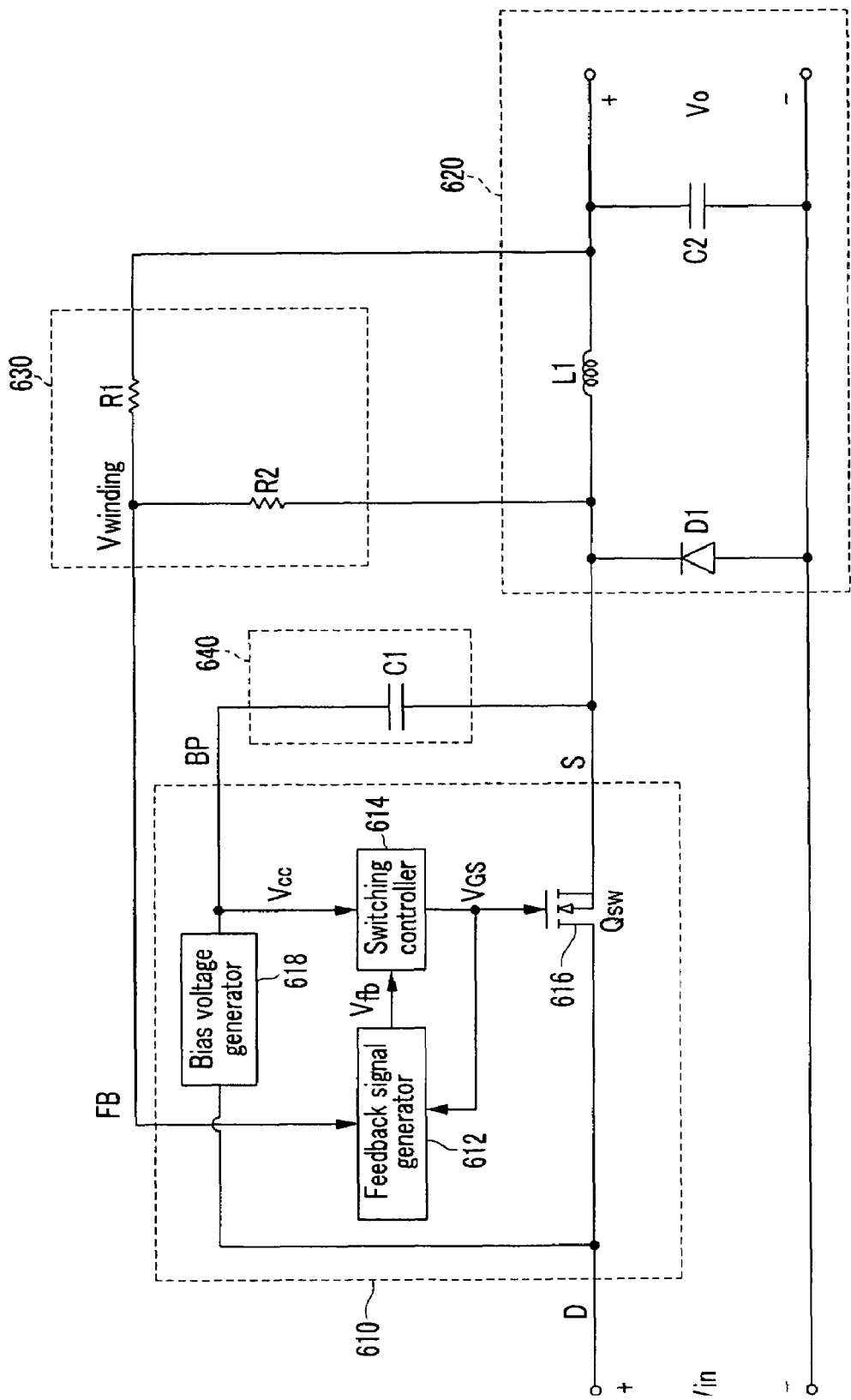
FIG. 12 is a diagram of a non-isolated SMPS.

FIG. 12 is a diagram of the non-isolated SMPS. The non-isolated SMPS shown in FIG. 12 may include a controller 610, an output unit 620, a voltage distribution unit 630, and a bias voltage supply unit 640.

The controller 610 may be realized as a single IC, and it may include a drain terminal D, a source terminal S, a bypass terminal BP, and four input terminals of a feedback terminal FB.

The drain terminal D can receive an input voltage Vin of the non-isolated SMPS. The source terminal S can output an output signal according to an on/off operation of a switching transistor 616 to the output unit 620 and the bias voltage supply unit 640. The bypass terminal BP can be coupled to the bias voltage supply unit 640 to receive a driving voltage Vcc of a switching controller 614. The feedback terminal FB may receive the Vwinding voltage from the voltage distribution unit 630.

The controller 610 can include a feedback signal generator 612, the switching controller 614, the switching transistor 616, and a bias voltage generator 618.

The feedback signal generator 612 can receive the Vwinding voltage through the feedback terminal FB and the gate control signal VGS of the switching transistor 616 to generate the feedback signal Vfb, and transmit it to the switching controller 614.

The switching controller 614 can receive a bias voltage input from the bypass terminal BP and the feedback signal Vfb from the feedback signal generator 612 to generate the switching control signal VGS, thus controlling an on/off operation of the switching transistor 616. The switching controller 614 may operate only when the Vcc voltage input from the capacitor C1 through the bypass terminal BP is greater than a predetermined voltage.

The switching transistor 616 can receive the input voltage Vin through a drain coupled to the drain terminal D of the controller 610, and can be turned on/off according to the switching control signal VGS that is input through a gate, to output a signal through a source terminal S.

The bias voltage generator 618 can be coupled to the drain terminal D to be operated by the input voltage Vin while the switching transistor 616 is turned off, and charges the capacitor C1 coupled to the bypass terminal BP.

The output unit 620 can include a diode D1 having a cathode coupled to the source terminal S of the controller 610, an inductor L1 having a terminal coupled to the cathode of the diode D1, and a capacitor C2 having a terminal coupled to another terminal of the inductor L1 and another terminal coupled to an anode of the diode D1. The voltage applied the capacitor C2 is the output voltage Vo.

The diode D1 may form a freewheeling path to flow a current to the inductor L1 through the capacitor C2 and the diode D1, when the switching transistor 616 of the controller 610 is turned off.

The voltage distribution unit 630 can include resistors R1 and R2. A first terminal of the resistor R1 and a first terminal of the resistor R2 can be coupled to the (above-mentioned) two terminals of the inductor L1 in the output unit 620. The second terminals of the resistors R1 and R2 can be coupled together in a node.

The voltage distribution unit 630 can scale down the voltage across the inductor L1 according to the ratio of the resistors R1 and R2 to generate the Vwinding voltage at the shared terminal of the resistors. The Vwinding voltage can be transferred to the feedback terminal PB of the PWM controller 610.

The bias voltage supply unit 640 can include a capacitor C1 with one terminal coupled to the source terminal S of the PWM controller 610 and with the other terminal coupled to the bypass terminal BP.

The feedback signal generator 612 of the PWM controller 610 can be similar or analogous to the feedback signal generator 500 in FIG. 1, detailed in FIG. 2. The signal waveforms can be similar or analogous to the signals and waveforms shown in FIG. 3.

The non-isolated SMPS can have a structure that is similar to a buck-direct feedback converter or a buck boost-direct converter. It need not use an expensive and large device such as an opto-coupler or a constant current LED driver that is often used to form a feedback loop. Further, unlike a buck-direct feedback converter or a buck boost-direct converter, the non-isolated SMPS can directly apply a voltage across the inductor L1 of the output unit 620, transfer the voltage to the feedback signal generator 612 of the controller 610, and control the switching transistor Qsw using the voltage, thereby more accurately detecting an output DC voltage of the output unit 620.

Figure 13:
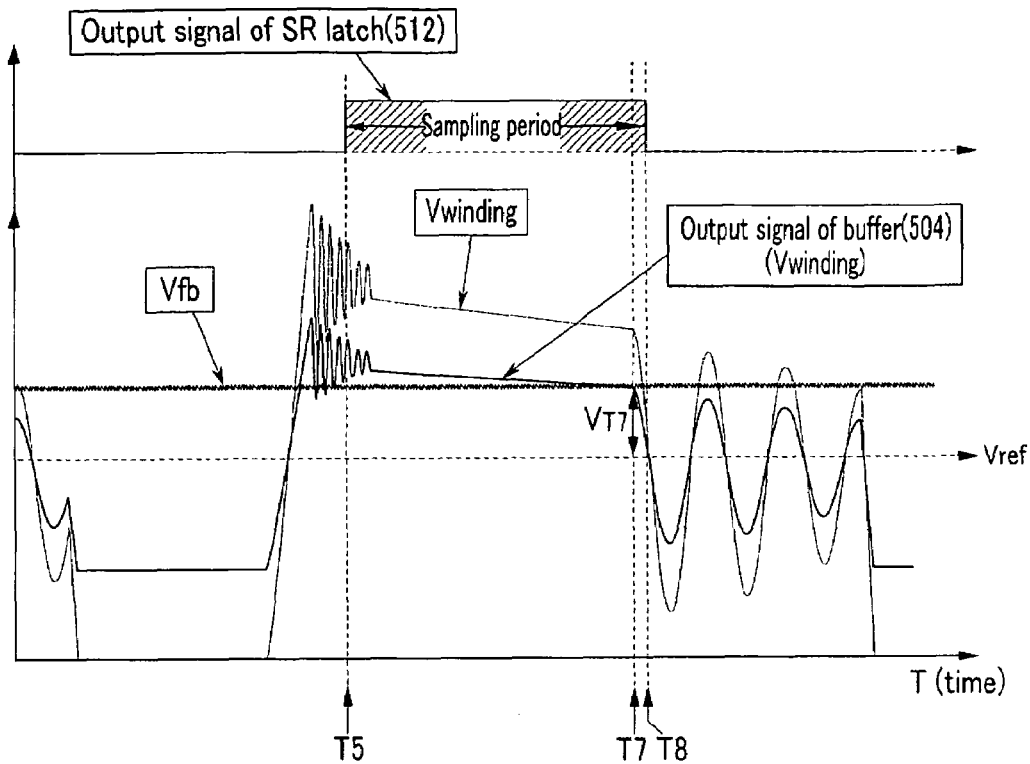
FIG. 13 is a diagram illustrating a measured waveform of a feedback signal that is output from the feedback signal generator.

FIG. 13 is a diagram illustrating a waveform of a feedback signal output from the feedback signal generator 612 or 500.

As shown in FIG. 13, the feedback signal Vfb output from the feedback signal generator 500 shown in FIG. 1 or 612 shown in FIG. 12 can have a voltage level that approximates well the voltage level $V_{T7}$ shown in FIG. 11 since the voltage difference between the voltage level $V_{T7}$ and the Vavg voltage is low.

In addition, the switching controller 400 shown in FIG. 1 or 614 shown in FIG. 12 may include a sensing voltage converter (not shown) for increasing a sensing voltage Vsense by a voltage of ((Vdiff2−Vdiff1)/2). That is, since the switching controller 400 shown in FIG. 1 or 614 shown in FIG. 12 compares the output signal of the sensing voltage converter and the feedback signal Vfb to generate a pulse width modulation signal, the voltage difference between the voltage level $V_{T7}$ and the Vavg voltage can be compensated, and a turn-off time of the switching transistor Qsw may be more precisely adjusted.

The SMPS of various embodiments may precisely detect the DC output voltage of the output unit 200 shown in FIG. 1 or 620 shown in FIG. 12.

Additional embodiments of the described invention may be realized not only as an apparatus and a method, but through a program on a recording medium for any part of the functionalities of the described apparatus or method.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For example, as described above, by sensing an output voltage using a gate control signal and a voltage that is applied to the coil L3 of the transformer that is included in an isolated SMPS and controlling the duty or on-time of the switching transistor $Q_{SW}$ through the output voltage, it is not necessary to use an expensive and large device such as an opto-coupler or a shunt regulator that is required for forming a feedback loop that transfers a voltage or current of the output unit to the primary side L1 of the transformer, so that a highly integrated and inexpensive SMPS can be embodied.

Further, by directly distributing a voltage that is applied between the terminals of the inductor L1 of the output unit 620 that is included in a non-isolated SMPS, transferring a distributed voltage to the feedback signal generator 612 of the PWM controller 610, and controlling the switching transistor Qsw using the voltage, an output DC voltage of the output unit 620 can be more accurately detected.

What is claimed is:

1. A switching mode power supply comprising:
    a power supply unit comprising a switch, coupled to a primary coil at a primary side of a transformer for converting an input DC voltage, configured to supply power to a secondary coil and a tertiary coil at a secondary side of the transformer according to an operation of the switch;
    a switching controller configured to receive a feedback voltage corresponding to a first voltage generated in the secondary coil at the secondary side of the transformer, to receive a detection signal corresponding to a current flowing through the switch, and to control an on/off operation of the switch by applying a switching control signal to the switch; and
    a feedback signal generator configured
        to receive the first voltage and the switching control signal,
        to sample the first voltage by using a first pulse string,
        to generate the feedback voltage according to a level of the first voltage sampled according to a first pulse in the first pulse string,
        to change a toggling time of the first pulse string in a first period for sampling the first voltage, and
        to change a time for sampling the first voltage.

2. The switching mode power supply of claim 1, wherein the feedback signal generator is configured to vary the time for sampling the level of the first voltage continuously.

3. The switching mode power supply of claim 1, wherein the feedback signal generator is configured to vary the time for toggling the first pulse strings irregularly.

4. The switching mode power supply of claim 3, wherein the feedback signal generator is configured to sample the first voltage by using two or more pulse strings including the first pulse string, and the first pulse is a pulse that precedes a pulse that is most adjacent to a time when the first period ends among the pulses in the pulse strings.

5. The switching mode power supply of claim 4, wherein the two or more pulse strings are toggled with different timing.

6. The switching mode power supply of claim 5, wherein a toggling time of the two or more pulse strings is varied.

7. The switching mode power supply of claim 6, wherein each toggling time of the two or more pulse strings is irregularly varied.

8. The switching mode power supply of claim 7, wherein each toggling time of the two or more pulse strings is continuously varied.

9. The switching mode power supply of claim 1, wherein the switching transistor, the switching controller, and the feedback signal generator are formed in a single chip.

10. The switching mode power supply of claim 1, wherein the switching controller and the feedback signal generator are formed in a single chip and the switching transistor is formed in a separate chip.

11. A switching mode power supply configured to generate an output DC voltage by converting a DC voltage, the switching mode power supply comprising:
    a controller comprising a switch having a first terminal coupled to an input terminal of the DC voltage, the controller configured to control an operation of the switch according to a voltage level of a first voltage corresponding to the output DC voltage;
    an output unit comprising an inductor with one terminal coupled to a second terminal of the switch, a capacitor with one terminal coupled to another terminal of the inductor, and a diode with an anode coupled to another terminal of the capacitor and with a cathode coupled to one terminal of the inductor, the output unit configured to generate the output DC voltage according to turning on/off of the switch; and
    a voltage distribution unit configured to distribute a voltage that is applied across the terminals of the inductor to generate the first voltage,
    wherein the controller further comprises:
    a switching controller configured to receive a feedback voltage corresponding to the first voltage and to control an on/off operation of the switch by generating a switching control signal, and
    a feedback signal generator configured
        to receive the first voltage and the switching control signal,
        to sample the first voltage by using a first pulse string,
        to generate the feedback voltage according to a level of the first voltage sampled according to a first pulse in the first pulse strings,
        to change a toggling time of the first pulse strings in a first period for sampling the first voltage, and
        to change a time for sampling the first voltage.

12. The switching mode power supply of claim 11, wherein the time for sampling the level of the first voltage is continuously varied.

13. The switching mode power supply of claim 11, wherein the time for toggling the first pulse strings is irregularly varied.

14. The switching mode power supply of claim 13, wherein the feedback signal generator samples the first voltage by using two or more pulse strings including the first pulse strings, and the first pulse is a pulse that is previous to a pulse that is most adjacent to a time when the first period ends in the first period among the plurality of pulses in the respective pulse strings.

15. The switching mode power supply of claim 14, wherein the two or more pulse strings are toggled with different timing.

16. The switching mode power supply of claim 15, wherein each toggling time of the two or more pulse strings is varied.

17. The switching mode power supply of claim 16, wherein each toggling time of the two or more pulse strings is irregularly varied.

18. The switching mode power supply of claim 17, wherein each toggling time of the two or more pulse strings is continuously varied.

19. The switching mode power supply of claim 18, wherein the feedback signal generator comprises:
- a comparator configured to compare the first voltage to a reference voltage that is input to first and second terminals, and to output a first signal having a first level when the reference voltage is higher than the first voltage and a second level when the reference voltage is lower than the first voltage;
- a signal delay unit configured to randomly delay a switching control signal for controlling an on/off operation of the switch, to convert a phase thereof, and to output a second signal;
- a pulse converter configured to output a third signal maintaining a fifth level during a second period corresponding to a first time when the second signal is changed from a third level to a fourth level, and outputting the third signal having a sixth level during other periods;
- a first logical operation unit configured to receive the first signal and the third signal through a third terminal and a fourth terminal, and to convert an output signal before a third time when the first signal is first changed to the first level while the third signal is maintained at the sixth level after a second time when the third signal is changed to the fifth level while the first signal is maintained at the second level;
- a pulse string generator configured to generate the two or more pulse strings;
- a sampling unit configured to store a level of the first voltage sampled by the plurality of pulses during a period between the second time and the third time; and
- a sampling signal output controller configured to output the first voltage sampled as the first pulse among the voltage levels of the first voltage sampled by the plurality of pulses.

20. The switching mode power supply of claim 19, wherein the first period is a period between the second time and the third time.

21. The switching mode power supply of claim 19, wherein the reference voltage is a ground voltage.

22. The switching mode power supply of claim 19, wherein the signal delay unit comprises:
- a variable delay unit configured to randomly delay the switching control signal;
- a fix delay unit configured to delay an output signal of the variable delay unit by a predetermined third period; and
- an inverter configured to output the second signal obtained by converting a phase of an output signal of the fix delay unit.

23. The switching mode power supply of claim 22, wherein the variable delay unit comprises:
- a pulse string generator configured to output pulse strings including a plurality of pulses;
- an N bit counter configured to store bit values of N bits, to increase the bit value when the pulse strings input from the pulse string generator are a seventh level, and to output a fourth signal that has a ninth level when all the N bit values are eighth levels; and
- a second logical operation unit configured to sample and output the switching control signal when the fourth signal is the ninth level, and to output the previous output signal when the fourth signal is a tenth level.

24. The switching mode power supply of claim 23, wherein the fix delay unit comprises at least one third logical operation unit that is configured to sample and output an output signal of the second logical operation unit when the fourth signal is the ninth level, and to output the previous output signal when the fourth signal is a tenth level.

25. The switching mode power supply of claim 19, wherein the pulse string generator comprises two or more pulse string generators configured to respectively generate two or more pulse strings, and the two or more pulse string generators are simultaneously reset at the first time to re-generate the two or more pulse strings.

26. The switching mode power supply of claim 25, wherein the sampling unit comprises:
- two or more second logical operation units configured to receive an output signal of the first logical operation unit and one of the two or more pulse strings, and to perform an AND operation; and
- two or more first latches configured to sample and output a voltage level of the first voltage when the output signal of the fifth logical operation unit becomes a seventh level, and to output the previous output signal when the output signal of the fifth logical operation unit is an eighth level,
- wherein the number of the fifth logical operation units and the first latches are respectively the same as the number of pulse string generators.

27. The switching mode power supply of claim 26, wherein the feedback signal generator comprises:
- a switch having a terminal selectively coupled to one output terminal of the two or more first latches according to a control operation of the sampling signal output controller; and
- a switching controller coupled to another terminal of the switch to output a voltage level of the first voltage that is input through the switch to the switching controller.

28. The switching mode power supply of claim 27, wherein the sampling signal output unit comprises:
- a second latch configured to output the previous output signal when a driving control signal applied from the sampling signal output controller is the ninth level, and to sample and output the voltage level of the first voltage that is input through the switch when the driving control signal becomes a tenth level; and
- a low pass filter configured to filter and output an output signal of the second latch.

29. The switching mode power supply of claim 28, wherein the sampling signal output controller comprises two or more pulse string input terminals corresponding to the number of pulse string generators, and is configured to receive the two or more pulse strings through the respective pulse string input terminals.

30. The switching mode power supply of claim 29, wherein the sampling signal output controller is configured:
- to store first corresponding information matching the two or more pulse string generators with the two or more pulse string input terminals, and second corresponding information matching the two or more pulse string generators with the two or more first latches;
- to store an input order for firstly receiving a pulse through the two or more pulse string input terminals among the plurality of pulses in the two or more pulse strings in the sampling period; and
- to control the switch based on the stored input order to connect one terminal of the switch to an output terminal of the first latch corresponding to the first pulse among the two or more first latches at the third time.

31. The switching mode power supply of claim 30, wherein the sampling signal output controller is configured to change the driving control signal to the tenth level at the third time.

32. The switching mode power supply of claim 31, wherein the ninth level is a low level, and the tenth level is a high level.

33. The switching mode power supply of claim 22, wherein the first level, the third level, the fifth level, and the tenth level are low levels, and the second level, the fourth level, the sixth level, the seventh level, the eighth level, and the ninth level are high levels.

34. The switching mode power supply of claim 24, wherein the first level, the third level, the fifth level, and the eighth level are low levels, and the second level, the fourth level, the sixth level, and the seventh level are high levels.

35. A driving method of a switching mode power supply for converting an input voltage according to an operation of a switch to generate an output voltage, the driving method comprising the steps of:
generating a first voltage corresponding to the output voltage;
sampling the first voltage by using a first pulse in a first pulse string during a first period;
controlling an on/off operation of the switch according to a level of the sampled first voltage;
varying a time for toggling first pulse strings during the first period; and
varying a time for sampling the level of the first voltage.

36. The driving method of claim 35, wherein the time for sampling the level of the first voltage is continuously varied.

37. The driving method of claim 35, wherein the time for toggling the first pulse strings is irregularly varied.

38. The driving method of claim 37, wherein the sampling of the first voltage comprises
sampling the first voltage by using two or more pulse strings including the first pulse string, wherein the first pulse precedes a pulse that is most adjacent to a time when the first period ends among the plurality of pulses in the respective pulse strings.

39. The driving method of claim 38, further comprising toggling the two or more pulse strings with different timing.

40. The driving method of claim 39, further comprising varying each toggling time of the two or more pulse strings.

41. The driving method of claim 40, further comprising varying each toggling time of the two or more pulse strings irregularly.

42. The driving method of claim 41, further comprising varying each toggling time of the two or more pulse strings continuously.

43. The driving method of claim 42, further comprising establishing the first period by performing a logical operation for a second signal output by comparing a first signal that maintains a third level during a second period corresponding to a first time when a control signal for controlling an on/off operation of the switch is changed from a first level to a second level, and that has a fourth level during other periods.

44. The driving method of claim 43, wherein the second signal is a fifth level when the first voltage is higher than the reference voltage, and is a sixth level when the first voltage is lower than the reference voltage.

45. The driving method of claim 44, wherein the first period begins at a second time when the first signal is changed to the third level while the second signal is maintained at the first level, and ends at a third time when the second signal is firstly changed to the sixth level after the second time.

46. The driving method of claim 45, wherein the second time is continuously varied.

47. The driving method of claim 45, wherein the first level, the fourth level, and the fifth level are high levels, and the second level, the third level, and the sixth level are low levels.

* * * * *